United States Patent [19]

Heidelberg

[11] 4,055,123
[45] Oct. 25, 1977

[54] SYSTEMS FOR MAGNETICALLY SUPPORTING A VEHICLE

[76] Inventor: Gotz Heidelberg, Am Hugel 16, D-8136 Percha, Germany

[21] Appl. No.: 598,271

[22] Filed: July 23, 1975

[30] Foreign Application Priority Data

July 26, 1974 Germany .............................. 2436106
Oct. 17, 1974 Germany .............................. 2449528

[51] Int. Cl.² ............................................. B61B 13/08
[52] U.S. Cl. ..................... 104/148 LM; 104/148 MS
[58] Field of Search ................ 104/148 LM, 148 MS, 104/148 SS, 130; 308/10; 310/12, 13

[56] References Cited

U.S. PATENT DOCUMENTS

| 3,158,765 | 11/1964 | Polgreen | 104/148 MS |
|---|---|---|---|
| 3,585,423 | 6/1971 | Bolton et al. | 310/13 |
| 3,588,555 | 6/1971 | Laithwaite et al. | 104/148 LM X |
| 3,626,858 | 12/1971 | Colling et al. | 104/148 LM |
| 3,638,093 | 1/1972 | Ross | 104/148 MS |
| 3,783,794 | 1/1974 | Gopfert et al. | 104/148 MS |
| 3,828,686 | 8/1974 | Steenbeck et al. | 104/148 LM X |
| 3,845,721 | 11/1974 | Wagner | 104/148 LM |
| 3,850,108 | 11/1974 | Winkle | 104/148 LM X |
| 3,899,979 | 8/1975 | Godsey | 104/148 LM X |

FOREIGN PATENT DOCUMENTS

| 624,024 | 5/1949 | United Kingdom | 104/148 LM |
|---|---|---|---|
| 1,307,833 | 2/1973 | United Kingdom | 310/12 |

Primary Examiner—Trygve M. Blix
Assistant Examiner—Barry L. Kelmachter
Attorney, Agent, or Firm—Spencer & Kaye

[57] ABSTRACT

A system for magnetically supporting a vehicle equipped with permanent magnets and propelled by a linear induction motor along a roadway defined by a stator member energized by polyphase alternating current, the system including members located on the vehicle for maintaining the air-gap between the pole faces of the permanent magnets and the stator member. In a preferred form the air-gap maintaining members are electro-magnets whose energizing windings are supplied with variable current to effect the control of the air-gap distance.

13 Claims, 9 Drawing Figures

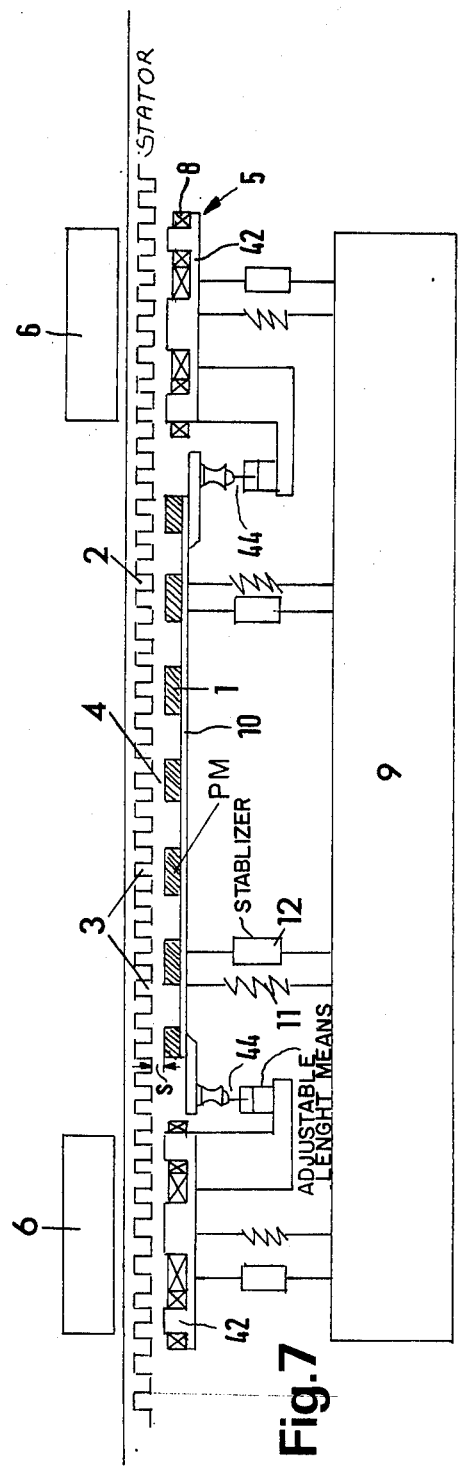
Fig. 7
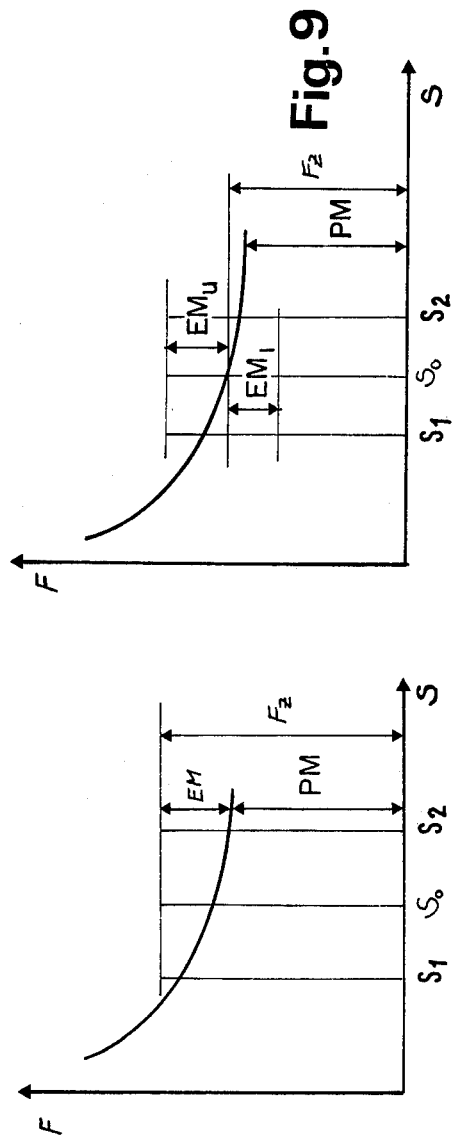
Fig. 8
Fig. 9

SYSTEMS FOR MAGNETICALLY SUPPORTING A VEHICLE

FIELD OF THE INVENTION

The present invention relates to a system of magnetically supporting a vehicle moving along a roadway, by means of a magnetic field between the vehicle and the roadway.

PRIOR ART

In order to support a vehicle, it is necessary to provide a supporting force acting between the vehicle and the roadway. This force is not constant but depends on the vehicle load, and on dynamic effects, such as changes in the roadway, centrifugal forces or lateral thrust due to wind acting on the vehicle.

In the case of vehicles which have long been known and which are supported, e.g. mechanically, by wheels on the roadway, changes in the required supporting force result in changes in the force transmitted from the wheels to the vehicle, so that the vehicle is automatically retained at a desired distance from the roadway, or within a desired range of distances if there is a resilient connection between the vehicle and the wheels.

It is also known to support vehicles by magnetic fields so that they hover without contact with the roadway. To this end, electro-magnets have hitherto been secured to the vehicle. The electro-magnets have to be controlled, e.g. by varying the current flowing through their energizing windings, so as to provide the supporting force required to keep the vehicle hovering at each instant. The control system must be constructed to allow for a large range of bearing forces, depending on the weight ratio of the empty to the loaded vehicle, and must be designed to alter the supporting force in response to dynamic changes, which may be considerable whilst the vehicle is in motion. Such control systems are both complex and expensive.

SUMMARY OF THE INVENTION

It is an object of the invention to provide a system of the aforementioned kind, which requires a less complex and expensive control system.

According to the present invention there is provided a system for supporting a vehicle moving along a roadway, including: a stator member provided along said roadway; a plurality of permanent magnets located on said vehicle, and defining an air-gap between a surface of each permanent magnet defining a pole face, and the stator member; and means located on said vehicle for maintaining the air-gap between said pole faces of the permanent magnets and the stator member.

The basic principle of the invention, therefore, is that most of the supporting force required at any time is supplied by an attractive permanent-magnet field, and that the reaminder of the force required at any particular time is supplied by adjustable additional forces coming from a spacing device. Consequently, it is not necessary to control a heavy total current, as when vehicles are supported entirely by electromagnets, but it is sufficient to adjust smaller, stabilizing additional forces.

The additional forces are preferably mechanical or electro-magnetic. With regard to the apparatus, wheels are preferable since they are particularly simple spacing devices, whereas the electro-magnetic additional forces can be delivered by electro-magnets. However, a combination of mechanical and electromagnetic additional forces is possible.

In principle, the wheels and/or electro-magnets in the spacing device can be located on the roadway and/or on the vehicle. Preferably, however, they are located on the vehicle, since otherwise the entire roadway will have to be provided with the spacing device, resulting in considerable installation costs.

The attractive electro-magnets in the spacing device can be located either below and/or above the ferro-magnetic parts. Similarly, the wheels can exert upward forces on the vehicle by rolling on regions of the roadway below the wheels, and/or can exert downward forces on the vehicle by rolling along regions of the roadway above the wheels.

The permanent magnets can be designed so that they supply a part of the entire force required for supporting the vehicle, the part being less than the minimum required supporting force. In such cases, the additional forces provided by the spacing device must always act upwards and have to be varied only sufficiently to deliver the supporting force required in each case. The other extreme is to design the permanent magnets so that the force delivered by them is greater than the maximum required supporting force. In that case, the forces delivered by the spacing device must be downward. Intermediate designs between these extremes are possible. Particular preference is given to an intermediate design in which the forces to be supplied by the spacing device are kept to a minimum.

A special feature of attractive permanent magnets is that their force/gap width characteristic is such that when the gap width decreases the attractive forces delivered by the permanent magnets increase. This results in unstable automatic control of the permanent magnets. If the force required for supporting the vehicle is increased, i.e. statically by an increased load or dynamically by a concavity (seen from above) in the roadway, centrifugal forces, lateral thrust due to wind, or the like, the gap width tends to increase between the pole faces of the permanent magnets and the surface of the facing ferro-magnetic parts. When the gap width increases, the permanent magnets deliver a lower attractive force, so that the vehicle will fall down unless stabilized. Similar conditions prevail when the required supporting force decreases, with the result that the pole faces of permanent magnets approach the facing surfaces of the ferro-magnetic parts. The power required from the additional forces or the spacing device can be reduced by maintaining the gap width at a value which at least approximately corresponds to the required supporting force. To this end, the vertical distance between the wheel axles or the pole faces of the electro-magnets and the pole faces of the permanent magnets can be adjustable. For example, if the vehicle load increases, the pole faces of the electro-magnets and of the permanent magnets can be varied so as to reduce the gap width of the permanent magnets, and thus increase the force delivered thereby. This adjustment can be fixed, depending on the load at a particular time, or can be continuously varied at a relatively low frequency or can be varied at a high frequency so as to ensure that only the wheels or the electro-magnets follow or substantially follow irregularities along the ferro-magnetic parts, whereas the permanent magnets do not follow these movements, or to a much lesser extent. More particularly, if these adjustments are made automatically, sensors are required, so as to respond to the gap width of the electro-magnets or of the permanent magnets, or the forces delivered by the electro-magnets or the permanent magnets and/or the current flowing through the electro-magnets. It is particularly advantageous to have a control system for reducing the current required to energize the electromagnets to a minimum.

With regard to the drive of magnetically supported vehicles along the roadway, the main work hitherto has been done on electro-magnetic linear motors, which are particularly advantageous. According to the invention, the linear motor has a static frequency changer wherein conductors are incorporated in ferromagnetic material. Advantageously the travelling-field stator is a three-phase stator, and as conventional, the conductors of one phase are located in every third slot in the stator, and likewise with the conductors of the other two phases, the conductors being interconnected in zig-zag fashion in the phases. Magnetic fluxes supplied by an exciting permanent magnet are guided in the ferro-magnetic material of the travelling-field stator. Since the heavy current for driving the vehicle has to be supplied only to the conductors of the travelling-field stator, it does not have to be supplied or generated in the vehicle, a process which has hitherto led to serious difficulties. However, the entire roadway must be divided into a number of sections so that vehicles can be individually accelerated and slowed down.

It is assumed that according to the invention the vehicle is driven by a synchronous linear motor, in which case the travelling-field stator is supplied by a static frequency changer.

Consequently, the permanent magnets in the vehicle have both a supporting function and act as exciting magnets for the linear-motor drive. Advantageously, the longitudinal distance between the pole faces of alternating polarity in the permanent magnets is made equal to three times the spacing between slots in the travelling-field stator. This integrated construction greatly reduces the cost and weight of the vehicle.

Advantageously, the electro-magnets are also incorporated in the vehicle propulsion system, by locating them in accordance with the polarity, the pole-face arrangement and the pole pitch of the permanent magnets. To this end, some of the permanent magnets can be replaced by electro-magnets.

Another possible way of geometrically combining the electro-magnets with the permanent magnets is to weaken the effective field in front of the poles of the permanent magnets by providing a ferro-magnetic material and to vary the current flowing through the energizing windings acting on the ferro-magnetic material so that the weakening effect is intensified, reduced or changed into an intensifying effect.

Preferably, the wheels are made of material having low specific gravity, so as to reduce the forces required for accelerating or slowing down the wheels. The material, however, should have high tensile strength, at least in the peripheral direction of the wheels. It is preferably to use non-ferromagnetic material, e.g. glass-fiber reinforced plastics.

The electro-magnets of the spacing device are easier to control in proportion since the aforementioned force/gap-width characteristic of the permanent magnets is much flatter. Accordingly, the permanent magnets should preferably be made of a material having a relative permeability below 2.5.

Apart from the fact that "static" changes in load must be allowed for, the additional forces on the spacing device must be controlled at a relatively high frequency so that dynamic variations can rapidly be made in the required carrying force. One way of doing this has already been mentioned, i.e. varying the distance between the axles or the pole faces of the electromagnets and the pole faces of the permanent magnets. In the case of wheels, a dynamic control system is not necessary in principle, since the wheels then simply transmit dynamically alternating proportions of the supporting force. This may be adequate, particularly at low driving speeds. Dynamic control of the electro-magnets, e.g. by varying the current of the energizing windings, is preferable particularly at high driving speeds. The aforementioned sensors can be used for this purpose.

Advantageously, the permanent and/or electromagnets are secured to the vehicle via resilient intermediate elements. In addition, stabilizing elements can be interposed. In this manner, the acceleration provided by the control system need not be for the dead weight of the entire vehicle but only for the suspended weight, which is considerably less. Preferably the suspension has a low natural frequency. "Active" suspension or stabilization can also be provided and, on receiving sensor signals, can co-operate, via a servo-mechanism, in determining the range of movement of the suspension.

Preferably, certain regions of the vehicle are constructed as sliding surfaces and corresponding matching surfaces are provided on the roadway. This is a safety precaution which can come into effect if the electro-magnets fail or the wheels break, although these sliding surfaces can be dispensed with completely if wheels are present. Another advantage of sliding surfaces and matching surfaces is that the gap width of the permanent and/or electromagnets can be adapted to smaller maximum deflections, since infrequent or unlikely peak deflections can be absorbed by the sliding surfaces. It is also important to allow for travelling over switch points where, depending on the construction of the points, the previously-described "normal" vertical supporting activity may be partly interrupted.

The materials for the sliding and matching surfaces may more particularly be plastics, glass-fiber reinforced plastics, elastically deformable layers for equalizing pressures, rubber-mounted metal surfaces, or foam material. Lubricants can be added to the material or it can be coated with a substance having a low coefficient of friction. In addition, the sliding surfaces can be wetted with lubricants such as water, air, grease, molybdenum disulphide, or Teflon (Registered Trade Mark). This applies particularly to the stationary matching surfaces, which can be wetted in response to a sensor signal when a vehicle approaches. Furthermore, the materials for the sliding and matching surfaces can be provided with a heat-conducting adjuvant. The sliding surface on the vehicle can be a non-ferro-magnetic material, e.g. aluminum or a plastic plate covering the pole faces of the permanent magnets and, if required, of the electro-magnets, whereas the matching surface can be a non-ferro-magnetic material, non-conductive, e.g. plastic plate covering the surface of the ferro-magnetic parts or of the travelling-field stator. Preferably, the thickness of the two plates is such that their total thickness is between 20 and 70%, and preferably between 20 and 60%, of the average gap width. Sliding downwardly can advantageously be located on the vehicle surfaces for supporting the vehicle/underside so as to project beyond the floor of the vehicle.

Even if a spacing device (wheels or rollers) is not used during free travel, wheels, rollers or the like supporting devices are advantageously provided at stopping-places or vehicle servicing points, so as to form abutments at which the vehicle can come to rest when the electro-magnets are de-energized. Advantageously, the wheels are adjusted at a height such that the permanent magnets have a gap width at which the bearing force against the abutments is at a minimum.

In most applications, the vehicle is also guided laterally. Suitable wheels, rollers or the like guiding devices can also be provided for this purpose. Preferably, however, lateral guiding electro-magnets are located on both sides of the vehicle and co-operate with lateral ferro-magnetic parts along the roadway. The lateral guiding electro-magnets can also be suspended, stabilized and, if required, actively suspended and/or stabilized as described hereinbefore in the case of the vertical stabilization, when connected to the vehicle. Preferably, the lateral guiding electro-magnets, which are located on opposite sides of the vehicle, are hydraulically or pneumatically connected, thus simplifying the construction of the suspension and stabilization system. Alternatively, the lateral guiding electro-magnets can be combined with the vertical electro-magnets, e.g. by moving the surface of the lateral ferro-magnetic parts into a slanting position, and using similar electro-magnets for both purposes. More particularly, the ferromagnetic parts and the lateral ferro-magnetic parts can be spatially combined and the three-phase current conductors can also be embedded in slots in the lateral ferro-magnetic parts.

The magnetic field produced between the pole faces of the permanent magnets and (if required) of the electro-magnets and the facing ferro-magnetic parts or travelling-field stator automatically improves the lateral stability of vehicle motion, since the permanent magnets and (if required) electro-magnets tend, if a lateral outward movement occurs, to return the vehicle laterally to the ferro-magnetic parts or travelling-field stator. Advantageously, to take full advantage of this natural lateral stability, the lateral guiding electro-magnets are allowed to move laterally over a distance (preferably ± 3 to 5cm) with soft suspension if required, and corresponding free spaces are left in the vehicle and roadway for movement.

Mechanical lateral guide elements, co-operating with guide blocks located on the roadway, can be provided more particularly for travelling over switch points at which only small mechanical parts have to be adjusted. To this end, either the lateral guide elements or the guide blocks can be movable so that they can be moved out of the region in which they would otherwise come in contact with the matching element. Sliding surfaces and co-operating matching surfaces constructed in the same manner as described previously, can also be provided for normal lateral guidance and occasional lateral guidance by the lateral guide elements. At places at which the mechanical lateral guide elements co-operate with a guide block for laterally guiding the vehicle, because the magnetic lateral guidance is weakened or missing, it is also advantageous to switch off the opposite magnetic lateral guide system.

Frequently, a number of vehicles are coupled to form a train. In such cases, it is preferable to couple individual vehicles in a manner resistant to transverse vertical and/or horizontal forces, so that if the additional forces or the spacing system fails, the additional force or spacing system of the adjacent vehicle can be used, at least for emergency regulation of the permanent-magnet gap width for the vehicle in question.

BRIEF DESCRIPTION OF THE DRAWINGS

The present invention will now be described in greater detail, by way of example with reference to the accompanying drawings, wherein:-

FIG. 7 is a diagrammatic view, seen in the same direction as FIG. 3, showing another way of locating the permanent and electro-magnets on the vehicle, and their position relative to the travelling-field stator;

FIG. 8 is a graph illustrating the force/gap-width characteristic of the system according to the invention; and FIG. 9 is a graph illustrating the force/gap-width characteristic of a system according to the invention comprising additional electro-magnets located above the travelling-field stator.

DESCRIPTION OF THE PREFERRED EMBODIMENTS

Figure 1:
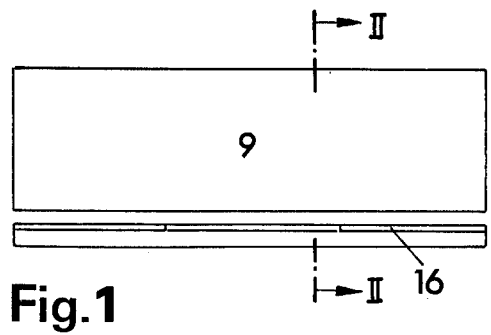
FIG. 1 is a diagrammatic side view of a vehicle to which the system according to the invention can be applied.
Figure 2:
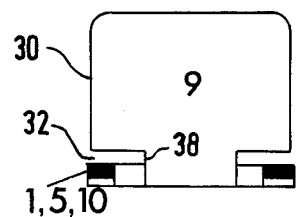
FIG. 2 is a cross-section taken along the line II—II in FIG. 1.

Referring first to FIGS. 1 and 2, a vehicle 9 is provided with longitudinal recess 32 at the bottom of both its side surfaces 30. As can be seen from FIG. 5, a travelling-field stator 2 having a rectangular cross section extends along the roadway, and is contained within the recess 32. Travelling-field stators 2 are provided on both sides of the roadway and extend continuously along it. Each stator is secured to a horizontal bearing plate 19, which is itself secured to the ground by suitable girders 34.

The recesses 32 are bounded at their lower sides by arms 10 which project outwardly on both sides of vehicle 9. The arms 10 extend along the entire length of the vehicle 9 and are positioned below the associated travelling-field stator 2. The arms 10 are each connected to the body 24 of vehicle 9 by two parallel located suspension elements 11 in the form of flat springs. Stabilizers 12 are provided between the arms 10 and the body 24, and extend obliquely upwards from the arms 10 to the body 24.

The upper part of the arms 10 house permanent magnets 1 and electro-magnets 5. The tops of the magnets 1 and 5 are covered by a plate 17, the upper surface of which serves as a sliding surface. Similarly, the bottoms of the arms 10 are each provided with a plate 23, the lower surface of which serves as a sliding surface. The plate 23 can make sliding contact with a matching surface (not shown) more particularly during breakdowns or at junctions, where the supporting activity of magnets 1 and 5 is partially interrupted. The plates 17 and 23 are interconnected by side walls 50, so that the arm 10 is prevented from bending or twisting. The two arms 10 are made as lightweight as possible, and are independently pivoted on the vehicle 9.

The stator 2 is constructed from a stack of vertically arranged laminations, which are insulated but bear in laminar manner on one another. As shown in FIG. 7, the underside of the stack of laminations is provided with transverse slots 3 in which the conductors of a three phase stator winding are located. The conductor of each phase is located in every third slot in zig-zag fashion along the travelling-field stator 2, so that the active part of each conductor is at right angles to the travelling-field stator in every third slot. Headspool portions 52 of the three phase winding are formed to the side of the lamination stack.

The underside of each stator 2 is covered by a similar plate 17 which is made of non-conductive material, and which serves as a sliding surface for the plates 17 located above the magnets 1 and 5 on the arms 10. An air gap 4 is provided between the facing surfaces of the stator 2 and the arm 10. The height, or vertical length, of the air gap is partly occupied by plates 17.

The lateral side of stator 2 which faces the vehicle 9 also bears lateral ferro-magnetic parts in the form of a stack 15 of horizontal laminations. Arms 36 project outwardly from the inner terminal surface 38 of the recess 32. The ends of arms 36 carry lateral guiding electro-magnets 13 located at the same height as stack 15. As previously explained, in connection with the stator 2 and magnets 1 and 5, the facing surfaces of the stack 15 and electro-magnets 13 are also covered with layers 17' which can slide on one another. An air-gap 4' is provided between the stack 15 and the magnets 13. A number of arms 36 are provided on both sides of the vehicle 9 along the entire length thereof, adjacent arms being connected by a rod. The purpose of the stack 15 is to protect the headspool portions 52 which face the vehicle 9. In an alternative form, the headspool portion 52 is embedded in sealing material and is secured by bolts to the stator 2.

A gap of between 5 to 10 cm is provided for the vehicle 9 to move laterally towards stator 2, both horizontally in and out the recess 32, and vertically in the recess 32, i.e. up and down with respect to the ground.

Figure 3:
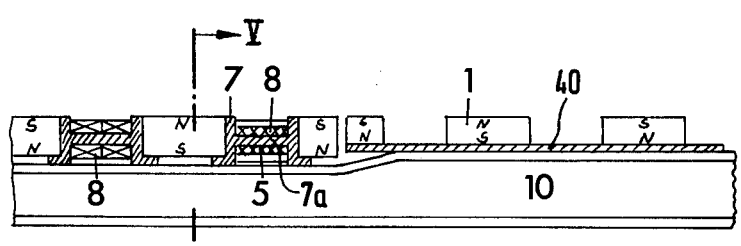
FIG. 3 is a cross sectional view on a larger-scale detail showing the bottom left hand corner region of the vehicle shown in FIG. 1; showing the arrangement of permanent and electro-magnets on the vehicle.

FIG. 3 shows in detail one way of positioning the permanent magnets 1 and electro-magnets 5 along the arm 10. Permanent magnets are located all the way along the top of arm 10 at regular intervals equal to the distance between three slots in the stator 2, so that north and south poles alternate with each other along the upper surface of the arm 10. In the central region of the arm 10, the individual permanent magnets 1 rest on a layer 40 of ferro-magnetic material. This layer 40 can be omitted if arm 10 is itself made of ferro-magnetic material. In this manner magnetic fluxes are produced, leading from each permanent magnet 1 through the underlying ferro-magnetic material 40 or 10 respectively to the neighbouring permanent magnet 1, which completes the circuit via the ferro-magnetic material of stator 2, back to the first-mentioned permanent magnet, thus closing the magnetic circuit. A number of annular closed magnetic circuits are successively arranged along the arm 10.

FIG. 3 shows part of the left end of arm 10, i.e. a bottom corner of vehicle 9. In the end region of the arm 10, in which electro-magnets 5 are also provided, the permanent magnets 1 are secured at both longitudinal ends by ferro-magnetic mounting means 7 which are L-shaped in longitudinal section through the arm 10. In the intermediate space between each pair of permanent magnets 1, members 7 are interconnected by webs 7a located half way up the height thereof. Energizing windings 8 are positioned on the webs 7a.

Since the members 7 are adjacent the permanent magnets 1, the effective field of magnets 1 is weakened. The current flowing through the energizing windings 8 can be varied so that the weakening can be intensified, reduced or converted into an intensification of the field of permanent magnets 1.

Figure 4:
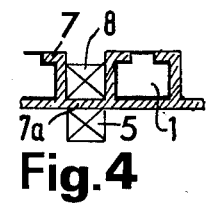
FIG. 4 shows an alternative way of locating the permanent and electro-magnets.

FIG. 4 shows another way of providing interaction between the electro-magnets 5 and the permanent magnets 1, the effect being similar but the geometrical construction being somewhat different. In FIG. 4, the ferro-magnetic mounting members 7 surround the magnets 1 almost completely, leaving only a central active pole face on the upper side which faces the travelling-field stator 2. The webs 7a lie in the plane of those regions of the members 7 located behind the permanent magnet 1. As in the construction shown in FIG. 3, the webs 7a are surrounded by energizing windings 8, to form electro-magnets 5 in these regions. The lower halves of windings 8 lie in recesses in the arm 10.

In the construction shown in FIG. 4, the arm 10 is a relatively rigid unit carrying both the permanent magnets 1 and the electro-magnets 5. It is connected to the vehicle body 24 and stabilized as a unit.

FIG. 7 shows a magnetic device for vertically supporting a vehicle along its entire length, the embodiment being different from the preceding examples. The travelling-field stator 2 is laminated, as in the embodiment shown in FIG. 2, and has transverse slots formed on its underside for receiving the conductors of a three phase winding for producing a travelling field. The arm 10 extends over a central region of the vehicle 9; the central region including most of the length of vehicle 9. Permanent magnets (PM) 1 are located on the top of the arm 10, as described in connection with the embodiment shown in FIG. 3. The arm 10 is connected to the vehicle via springs 11 and stabilizers, i.e. shock absorbers, 12.

Arms 42 are located at the front and rear end of the vehicle and likewise connected to the vehicle via springs 11 and stabilizers 12. The top of each arm 42 is in the form of a three-limbed yoke. Each limb is surrounded by substantially horizontal energizing windings 8, in order to produce the electro-magnets 5. The spacing between the limbs corresponds to the space between three slots in the stator 2. The same applies to the space between the limb facing the middle of the vehicle and the neighbouring permanent magnet 1. Since the magnetic polarity of the limbs is appropriately selected, the electro-magnets 5 have the correct polarity and pole pitch in order to form an extension of the row of permanent magnets 1.

Other electro-magnets 6 are rigidly connected by curved members (not shown) to the arms 42 and magnetically interact with the electro-magnets 5 through the material of the stator 2.

Means 44 of adjustable length are provided between each end of the arm 10 and the arms 42, so as to adjust the air-gap distances between the stator and the pole faces of permanent magnets 1. The means 44 can be hydraulic or pneumatic cylinder-piston systems or electro-magnetic, electro-mechanical or mechanical parts of adjustable length. The purpose of means 44 will be described in greater detail hereinafter.

The systems shown in both FIGS. 3 and 7 are located along both sides of vehicle 9 and the number of permanent magnets 1 and electro-magnets 5 is irrelevant.

The graphs of FIGS. 8 and 9 show the distribution of forces in the system according to the invention. Forces are plotted along the ordinate, whereas the abscissa shows the gap width $s$ between the pole faces of the magnets 1 facing the stator 2 and the opposite pole face of the stator 2. The continuous curve shows the characteristic of the entire system of permanent magnets 1. It will be seen from the graphs that when the gap width $s$ decreases, there is an increase in the force of attraction F acting between the pole face of the magnet and the ferro-magnetic material disposed opposite it. When the gap $s$ becomes very narrow, the increase is very steep. The graph shows the favorable effect of the plates 17, which preferably take up 20 to 60% of the average gap width and thus eliminate the disadvantageous, steep part of the characteristic.

In the case shown in FIG. 8, use is made of the permanent magnets 1 and attractive electro-magnets 5, all magnets being located under the stator 2. The permanent magnets 1 are located so that their total attractive force, PM, at the average gap width $s_o$ and in the total working range of gap widths between $s_1$ and $s_2$ is insufficient to carry the weight $F_z$ of the vehicle. The rest of the force, EM, needed to carry the vehicle is supplied by the electro-magnets 5 at each moment, and at each gap width in the range from $s_1$ to $s_2$.

FIG. 9 shows the position when use is made of the magnets 5 located under the stator 2 and also the upper magnets 6 which are located above the stator and also exert an attractive force $EM_\mu$, but thereby press the vehicle 9 downwards. It can be seen that when this system is used, the lower electro-magnets 5 have to be designed for small forces, $EM_1$, only and that, more particularly, at average values of the gap width $s_o$ and the force $F_z$ required for supporting the vehicle, the entire supporting force is provided by the force PM produced by permanent magnets 1 and the electro-magnets 5 and 6 do not need to provide any force whatsoever.

In view of the fact that all the force $F_z$ required for supporting the vehicle 9 is made up of substantially three components, i.e. the empty weight of the vehicle, the load and dynamic forces resulting from changes in direction, uneven places on the roadway, or gusts of wind, it will be appreciated that, more particularly at high useful-load to empty-weight ratios, the electro-magnets may provide a very considerable proportion of the total supporting force since the permanent magnets, e.g. in the construction shown in FIG. 8, have to be designed for the lowest supporting force which occurs, i.e. even below the empty weight of the vehicle. When the electro-magnets 5 are used in combination with upper electro-magnets 6 the situation is somewhat more favorable, but even here the electro-magnets have to provide a large reserve of power. The situation becomes considerably better if, e.g. when the load varies, the gap width $s$ between the permanent magnets and the stator 2 is adjusted to a different value. If, for example, the load is increased, the gap-width interval $s_1$ to $s_2$ in FIGS. 8 and 9 is displaced to the left, i.e. the gap width decreases, so that the electro-magnets can supply smaller forces. The same purpose is served by the adjustable-length means 44, which can be manual or automatic. The right distance between the upper pole faces of the permanent magnets and the upper pole faces of the electro-magnets 5, i.e. the right setting of the desired average gap width $s_o$, can be automatically obtained by suitable automatic devices, the measured variable being, e.g. the gap width $s$, the forces produced by the permanent magnets 1 and/or the electro-magnets 5 and 6, or the current flowing through the energizing windings of the electro-magnets 5 and 6.

The adjustment for compensating changes in dynamic supporting forces, which has to be made more frequently, is preferably done by altering the current to the energizing windings of the electro-magnets 5 or 6, preferably by using sensors which respond to the gap width between the pole faces of the electro-magnets 5 or 6 and the pole face of the stator 2, the adjustment resulting in a return to a given gap width.

Figure 5:
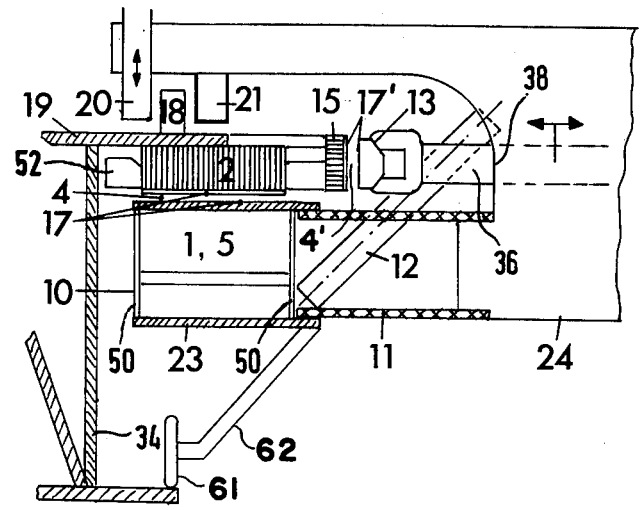
FIG. 5 is a cross-section view taken along the line V—V in FIG. 3, also showing a part of the roadway construction.
Figure 6:
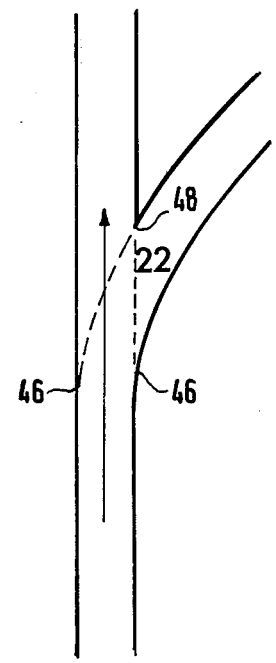
FIG. 6 is a plan view of a portion of the roadway showing a junction.

FIG. 5 shows inner lateral guiding elements 21 and outer lateral guiding elements 20 which extend downwards from the vehicle 9 into the recess 32. A guide block 18 is located on the top of the supporting plate 19 and extends into the space between the two guiding elements 20, 21. A system of this kind is particularly important for junctions in the form of switch points as shown in FIG. 6. Some switch points are constructed so that the horizontal lateral guide system and sometimes even the vertical supporting system may become partly inoperative at the switch blades 46, and at the place 48 on a switch point 22, at which the directions of two travelling-field stators 2 intersect. At such places, the vehicle 9 can be laterally guided by the elements 20, 21 and the block 18. Reliable operation can be secured either by making element 20 movable upwards from the region of the block 18, or by making block 18 movable downwards from the region of the elements 20, 21.

The drawings do not show another previously-described possibility, i.e. of using wheels as spacer members, either alone or in combination with controllable electro-magnets. However, it is very easy to see from FIG. 5 that wheels on a horizontal axle could be provided at the upper side of the arm 10, if required in addition to the magnets 1 or 5. The wheels could run on the underside of the plate 17 covering the stator 2, or on a specially provided surface beside the stator. The wheels would exert downward forces on the vehicle 9.

Upward forces on vehicle 9 can be exerted by wheels having circumferences which project, e.g. up into the recess 32, and move on the upper side of the plate 19.

Alternatively, the wheels can be located at the underside of the arm 10 and run on suitable surfaces so as to exert additional downward or upward forces on the vehicle 9. For example, as shown in FIG. 5, wheels 61 could be carried by wheel mount 62 connected to plate 23 to bear against, and roll upon, a bearing plate forming part of the roadway to supply an upward supporting force for the vehicle.

What I claim and desire to secure by Letters Patent is:

1. A magnetic system for supporting a vehicle moving along a roadway, including: a stator member provided along said roadway; a plurality of permanent magnets located on said vehicle and defining an air-gap between a surface of each permanent magnet defining a pole face and the stator member; means located on said vehicle for maintaining the air-gap between said pole faces of the permanent magnets and the stator member; means defining a magnetic lateral guide system between said vehicle and said roadway, said magnetic guide system being weakened in predetermined regions along said roadway; and means defining a mechanical lateral guide system composed of mechanical lateral guide elements secured to said vehicle, and guide blocks located on said stator member in those regions where said magnetic guide system is weakened and arranged to cooperate with said guide elements.

2. A magnetic system arranged between a roadway and a vehicle movable along the roadway for generating an attraction force between the vehicle and the roadway for supporting the vehicle, and a propulsion force active between the vehicle and the roadway for propelling the vehicle along the roadway, said system comprising:

means mounted on said roadway and comprising a plurality of laminations of a ferromagnetic material presenting a downwardly facing surface provided with a plurality of grooves extending transversely to said roadway and equi-spaced along the length of said roadway, and a multiphase winding located in said grooves, said laminations and winding constituting a multiphase stator producing a traveling magnetic field;

a plurality of permanent magnets mounted on the vehicle below said stator and extending along the length of said roadway to present alternating north and south poles facing said stator, the spacing between said north and south poles being equal to the product of the number of phases in said multiphase winding and the spacing between said lamination grooves;

said magnets exerting a magnetic attraction force on said laminations to produce at least a substantial part of the supporting force required by the vehicle and said magnets cooperating with said stator to define a synchronous linear induction motor; and means connected between the vehicle and the roadway for providing an adjustable supplemental force for maintaining the vertical distance between the lower surface of said stator and the tops of said permanent magnets in a predetermined range.

3. An arrangement as defined in claim 2 wherein said means for providing an adjustable supplemental force comprise a plurality of electromagnets mounted on the vehicle in line with said permanent magnets and arranged to produce magnetic fields of variable intensity.

4. An arrangement as defined in claim 3 wherein said electromagnets are located at the corners of the vehicle.

5. An arrangement as defined in claim 3 wherein said means for providing an adjustable supplemental force further comprise a plurality of additional electromagnets mounted on the vehicle above said stator and arranged to produce magnetic fields of varying intensity.

6. An arrangement as defined in claim 3 further comprising means supporting said electromagnets in a manner to permit variation of the vertical distance between the pole faces of said electromagnets and the pole faces of said permanent magnets which are directed toward said stator.

7. An arrangement as defined in claim 6 further comprising means on the pole faces of said permanent magnets and of said electromagnets constituting sliding surfaces and said stator presents a matching sliding surface on which said magnet sliding surfaces can slide.

8. An arrangement as defined in claim 6 wherein said means mounted on said roadway constitute two multiphase stators, each said stator being disposed adjacent a respective side of the location of a vehicle, and further comprising magnetic lateral vehicle guide means composed of lateral guiding electromagnets mounted at both sides of the vehicle and lateral ferromagnetic members on said stator at each side of the vehicle location, laterally spaced from said lateral guiding electromagnets and cooperating therewith to exert magnetic lateral guiding forces on the vehicle.

9. An arrangement as defined in claim 8 wherein the guiding force produced by said magnetic lateral vehicle guide means is weakened in predetermined regions along the roadway, and further comprising mechanical lateral guide blocks mounted on the roadway in those regions and arranged to exert a mechanical lateral guiding effect on the vehicle.

10. An arrangement as defined in claim 3 further comprising resilient intermediate elements connecting said electromagnets to the vehicle.

11. An arrangement as defined in claim 2 wherein said means for providing an adjustable supplemental force comprise a plurality of wheels and means rotatably mounting said wheels on the vehicle to bear against the roadway.

12. An arrangement as defined in claim 2 further comprising resilient intermediate elements connecting said permanent magnets to the vehicle.

13. An arrangement as defined in claim 12 further comprising stabilizing means connected between said permanent magnets and the vehicle.

* * * * *